United States Patent
Kretchman et al.

(10) Patent No.: US 6,382,486 B1
(45) Date of Patent: May 7, 2002

(54) FOLDABLE HITCH MOUNTED CARRIER DEVICE FOR A VEHICLE

(76) Inventors: William J. Kretchman, 614 Salisbury St., Meyersdale, PA (US) 15552; Randy W. Burkholder, 1680 Berlin St., Garrett, PA (US) 15542

(*) Notice: Subject to any disclaimer, the term of this patent is extended or adjusted under 35 U.S.C. 154(b) by 0 days.

(21) Appl. No.: 09/770,628

(22) Filed: Jan. 26, 2001

(51) Int. Cl.[7] .................................................. B60R 9/06
(52) U.S. Cl. ......................... 224/498; 224/509; 224/534
(58) Field of Search .............................. 224/498, 497, 224/509, 507, 505, 534

(56) References Cited

U.S. PATENT DOCUMENTS

| | | | | |
|---|---|---|---|---|
| 1,489,527 A | * | 4/1924 | Henry | 220/6 |
| 1,585,871 A | * | 5/1926 | Pels | 224/491 |
| 1,625,808 A | * | 4/1927 | Hyde | 224/498 |
| 1,686,450 A | * | 10/1928 | Henry | 224/498 |
| 1,743,220 A | * | 1/1930 | Johnson | 224/499 |
| 1,838,500 A | * | 12/1931 | Russell et al. | 224/498 |
| 1,886,911 A | * | 11/1932 | Schulman | 224/491 |
| 1,977,734 A | * | 10/1934 | Monckmeier | 224/498 |
| 2,554,776 A | * | 5/1951 | Comeau | 224/42.34 |
| 2,802,612 A | * | 8/1957 | Barcafer | 224/506 |
| 4,125,214 A | * | 11/1978 | Penn | 224/508 |
| 4,640,658 A | * | 2/1987 | Webb, Jr. | 224/497 |
| 4,744,590 A | | 5/1988 | Chesney | |
| 4,813,584 A | | 3/1989 | Wiley | |
| D314,543 S | | 2/1991 | Ott et al. | |
| 5,645,292 A | | 7/1997 | Mcwilliams et al. | |
| 5,810,374 A | | 9/1998 | Small | |
| 5,979,972 A | * | 11/1999 | Gehman | 224/401 |
| 5,996,869 A | | 12/1999 | Belinky et al. | |

* cited by examiner

Primary Examiner—Stephen P. Garbe

(57) ABSTRACT

A foldable hitch mounted carrier device for a vehicle for adding cargo carrying capacity for a vehicle. The foldable hitch mounted carrier device for a vehicle includes a frame assembly including a frame having elongate front, side, and back members; and also includes a hitch mounting member being securely attached to the frame and being adapted to be fastenably received by a hitch receiver on a vehicle; and further includes a netting arrangement being securely attached to the frame; and also includes adjustable tie-down members being attached to the frame for securing cargo thereon.

10 Claims, 2 Drawing Sheets

FOLDABLE HITCH MOUNTED CARRIER DEVICE FOR A VEHICLE

BACKGROUND OF THE INVENTION

1. Field of the Invention

The present invention relates to a carrier device for a vehicle and more particularly pertains to a new foldable hitch mounted carrier device for a vehicle for adding cargo carrying capacity for a vehicle.

2. Description of the Prior Art

The use of a carrier device for a vehicle is known in the prior art. More specifically, a carrier device for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,810,374; 4,813,584; 4,744,590; 5,996,869; 5,645,292; and U.S. Pat. No. Des. 314,543.

While these devices fulfill their respective, particular objectives and requirements, the aforementioned patents do not disclose a new foldable hitch mounted carrier device for a vehicle. The inventive device includes a frame assembly including a frame having elongate front, side, and back members; and also includes a hitch mounting member being securely attached to the frame and being adapted to be fastenably received by a hitch receiver on a vehicle; and further includes a netting arrangement being securely attached to the frame; and also includes adjustable tie-down members being attached to the frame for securing cargo thereon.

In these respects, the foldable hitch mounted carrier device for a vehicle according to the present invention substantially departs from the conventional concepts and designs of the prior art, and in so doing provides an apparatus primarily developed for the purpose of adding cargo carrying capacity for a vehicle.

SUMMARY OF THE INVENTION

In view of the foregoing disadvantages inherent in the known types of carrier device for a vehicle now present in the prior art, the present invention provides a new foldable hitch mounted carrier device for a vehicle construction wherein the same can be utilized for adding cargo carrying capacity for a vehicle.

The general purpose of the present invention, which will be described subsequently in greater detail, is to provide a new foldable hitch mounted carrier device for a vehicle which has many of the advantages of the carrier device for a vehicle mentioned heretofore and many novel features that result in a new foldable hitch mounted carrier device for a vehicle which is not anticipated, rendered obvious, suggested, or even implied by any of the prior art carrier device for a vehicle either alone or in any combination thereof.

To attain this, the present invention generally comprises a frame assembly including a frame having elongate front, side, and back members; and also includes a hitch mounting member being securely attached to the frame and being adapted to be fastenably received by a hitch receiver on a vehicle; and further includes a netting arrangement being securely attached to the frame; and also includes adjustable tie-down members being attached to the frame for securing cargo thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new foldable hitch mounted carrier device for a vehicle which has many of the advantages of the carrier device for a vehicle mentioned heretofore and many novel features that result in a new foldable hitch mounted carrier device for a vehicle which is not anticipated, rendered obvious, suggested, or even implied by any of the prior art carrier device for a vehicle, either alone or in any combination thereof.

It is another object of the present invention to provide a new foldable hitch mounted carrier device for a vehicle which may be easily and efficiently manufactured and marketed.

It is a further object of the present invention to provide a new foldable hitch mounted carrier device for a vehicle which is of a durable and reliable construction.

An even further object of the present invention is to provide a new foldable hitch mounted carrier device for a vehicle which is susceptible of a low cost of manufacture with regard to both materials and labor, and which accordingly is then susceptible of low prices of sale to the consuming public, thereby making such foldable hitch mounted carrier device for a vehicle economically available to the buying public.

Still yet another object of the present invention is to provide a new foldable hitch mounted carrier device for a vehicle which provides in the apparatuses and methods of the prior art some of the advantages thereof, while simultaneously overcoming some of the disadvantages normally associated therewith.

Still another object of the present invention is to provide a new foldable hitch mounted carrier device for a vehicle for adding cargo carrying capacity for a vehicle.

Yet another object of the present invention is to provide a new foldable hitch mounted carrier device for a vehicle which includes a frame assembly including a frame having elongate front, side, and back members; and also includes a hitch mounting member being securely attached to the frame and being adapted to be fastenably received by a hitch receiver on a vehicle; and further includes a netting arrangement being securely attached to the frame; and also includes adjustable tie-down members being attached to the frame for securing cargo thereon.

Still yet another object of the present invention is to provide a new foldable hitch mounted carrier device for a vehicle that is easily and conveniently mounted to a hitch of a vehicle.

Even still another object of the present invention is to provide a new foldable hitch mounted carrier device for a vehicle that is easily folded for storage when not needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
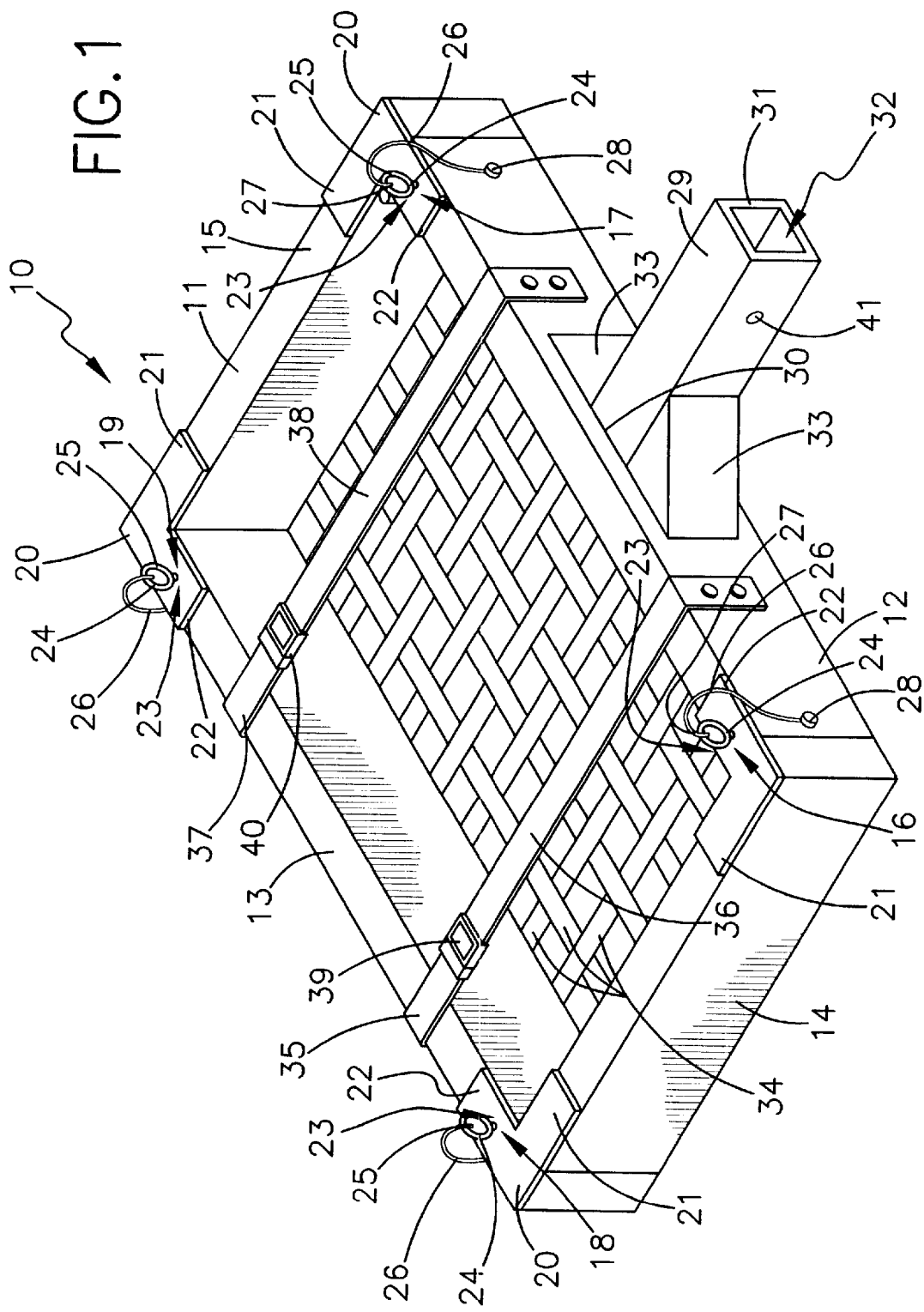
FIG. 1 is a perspective view of a new foldable hitch mounted carrier device for a vehicle according to the present invention.
Figure 2:
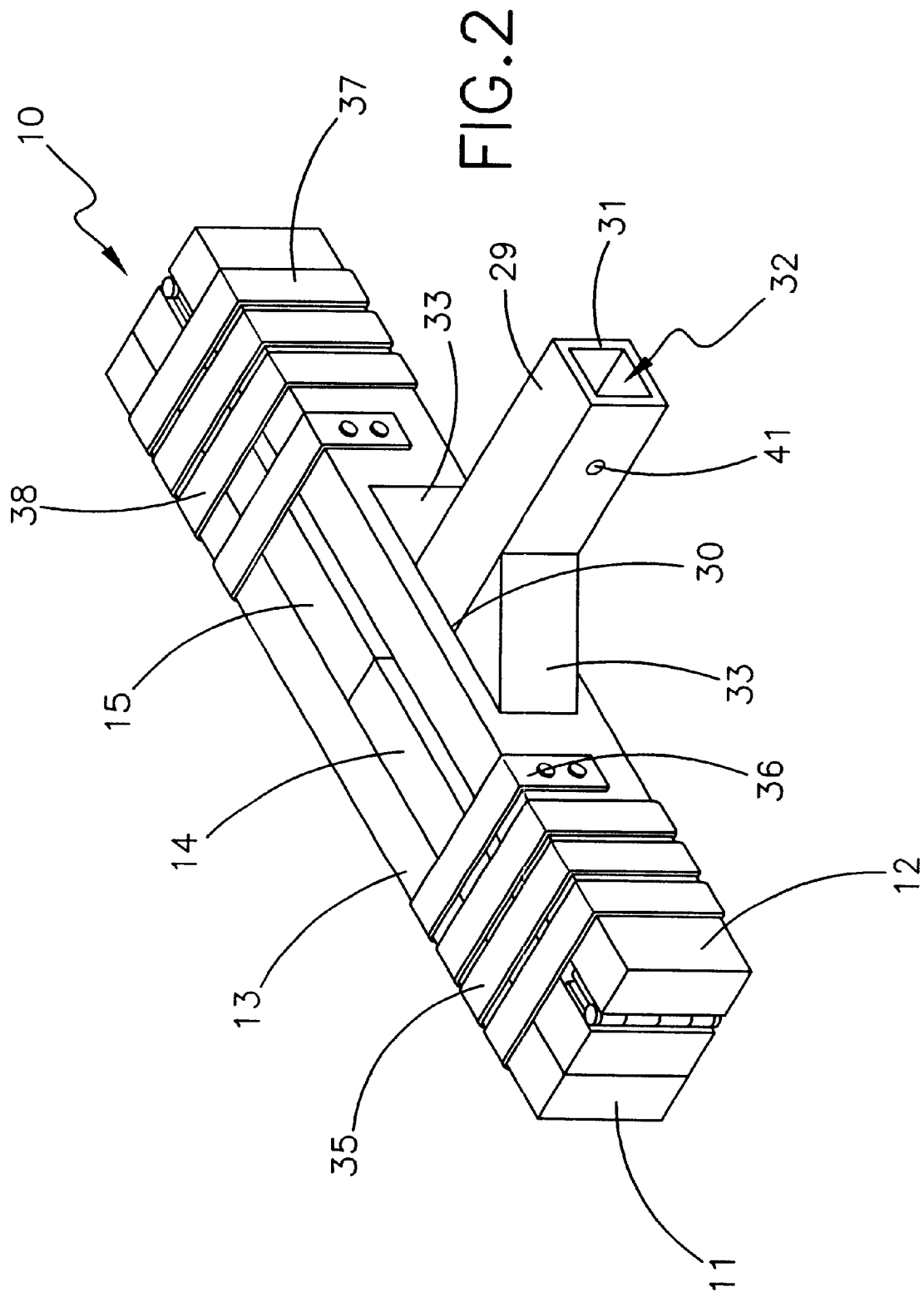
FIG. 2 is a perspective view of the present invention being folded for storage.

With reference now to the drawings, and in particular to FIGS. 1 through 2 thereof, a new foldable hitch mounted carrier device for a vehicle embodying the principles and concepts of the present invention and generally designated by the reference numeral 10 will be described.

As best illustrated in FIGS. I through 2, the foldable hitch mounted carrier device for a vehicle 10 generally comprises a frame assembly including a frame 11 having elongate front 12, side 14,15, and back 13 members. The elongate front member 12 is hingedly attached at ends thereof to ends of the elongate side members 14,15, and the elongate back member 13 is detachably and conventionally secured at ends thereof to the other ends of the elongate side members 14,15 to form a rectangular structure. The elongate front and back members 12,13 have holes 16–19 disposed through tops and near the ends thereof. The frame assembly further includes angled brace members 20 having first ends 21 securely and conventionally attached to the elongate side members 14,15 and having holes 23 disposed therethrough near second ends 22 thereof. The frame assembly also includes fastening members 24 being removably received through the holes 16–19,23 of the angled brace members 20 and the elongate front and back members 1213 for securing the elongate front and back members 12,13 to the elongate side members 14,15, and further includes cables 26 having first ends 27 and second ends 28 which are securely and conventionally attached to the frame 11 with the first ends 27 being securely and conventionally attached to the fastening members 24. The fastening members 24 are pin-like members having eyelet end portions 25. The elongate front, side, and back members 12–15 are elongate tubular members with the elongate side members 14,15 being foldable upon the elongate front member 12 and with the elongate back member 13 being detachably attached to the elongate side members 14–15. The frame 11 has a length of approximately 4¼ feet and a width of approximately 2¼ feet.

A hitch mounting member is securely and conventionally attached to the frame 11 and is adapted to be fastenably received by a hitch receiver on a vehicle. The hitch mounting member includes a tubular member 29 having a first end 30 being securely and conventionally attached to the elongate front member 12 and extending outwardly therefrom. The tubular member 29 also has an open second end 31 with a bore 32 extending in the hitch mounting member through the open second end 31, and further has a hole 41 being disposed through a side wall thereof near the open second end 31. The hitch mounting member further includes support braces 33 being securely and conventionally attached to the tubular member 29 and to the elongate front member 12 of the frame 11.

A netting arrangement 34 is securely and conventionally attached to the frame 11. The netting arrangement 34 is a mesh which is securely, conventionally, and detachably attached along bottoms of the elongate front, side, and back members 12–15. Adjustable tie-down members 35–40 are conventionally attached to the frame 11 for securing cargo. The adjustable tie-down members 35–40 include pairs of straps 35–38 having ends which are securely and conventionally attached to the frame 12, and also include buckle members 39,40 each of which adjustably fastens a respective the pair of straps 35–38 together to secure cargo loaded within the frame 12 and upon the netting arrangement 34. The pairs of straps 35–38 are removably and adjustably disposed across a top of the frame 11.

In use, the user attaches the hitch mounting member to a hitch receiver of a vehicle and erects the frame 11 as a rectangular structure with the netting arrangement 34 being securely attached to the frame 11. The user then places cargo within the frame 11 and upon the netting arrangement 34 and secures the cargo with the straps 35–38.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A foldable hitch mounted carrier device for a vehicle comprising:
   a frame assembly including a frame having elongate front, side, and back members;
   a hitch mounting member being securely attached to said frame and being adapted to be fastenably received by a hitch receiver on a vehicle;
   a netting arrangement being securely attached to said frame; and
   adjustable tie-down members being attached to said frame for securing cargo.

2. A foldable hitch mounted carrier device for a vehicle as described in claim 1, wherein said elongate front member is hingedly attached at ends thereof to ends of said elongate side members, and said elongate back member is detachably secured at ends thereof to the other ends of said elongate side members to form a rectangular structure, said elongate front and back members having holes disposed through tops and near said ends thereof.

3. A foldable hitch mounted carrier device for a vehicle as described in claim 2, wherein said frame assembly further includes angled brace members having first ends securely attached to said elongate side members and having holes disposed therethrough near second ends thereof.

4. A foldable hitch mounted carrier device for a vehicle as described in claim 3, wherein said frame assembly also includes fastening members being removably received through said holes of said angled brace members and said elongate front and back members for securing said elongate front and back members to said elongate side members, and further includes cables having first ends and second ends which are securely attached to said frame with said first ends being securely attached to said fastening members.

5. A foldable hitch mounted carrier device for a vehicle as described in claim 4, wherein said fastening members are pin-like members having eyelet end portions.

6. A foldable hitch mounted carrier device for a vehicle as described in claim 5, wherein said elongate front, side, and back members are elongate tubular members with said elongate side members being foldable upon said elongate front member and with said elongate back member being detachably attached to said elongate side members.

7. A foldable hitch mounted carrier device for a vehicle as described in claim 1, wherein said hitch mounting member includes a tubular member having a first end being securely attached to said elongate front member and extending outwardly therefrom, said tubular member also having an open second end with a bore extending in said hitch mounting member through said open second end, and further having a hole disposed through a side wall thereof near said open second end, said hitch mounting member further including support braces being securely attached to said tubular member and to said elongate front member of said frame.

8. A hitch mounted carrier device as described in claim 1, wherein said netting arrangement is a mesh which is securely and detachably attached along bottoms of said elongate front, side, and back members.

9. A hitch mounted carrier device as described in claim 1, wherein said adjustable tie-down members include pairs of straps having ends which are securely attached to said frame, and also include buckle members each of which adjustably fastens a respective said pair of straps together to secure cargo loaded within said frame and upon said netting arrangement, said pairs of straps being removably and adjustably disposed across a top of said frame.

10. A foldable hitch mounted carrier device for a vehicle comprising:
   a frame assembly including a frame having elongate front, side, and back members, said elongate front member being hingedly attached at ends thereof to ends of said elongate side members, and said elongate back member being detachably secured at ends thereof to the other ends of said elongate side members to form a rectangular structure, said elongate front and back members having holes disposed through tops and near said ends thereof, said frame assembly further including angled brace members having first ends securely attached to said elongate side members and having holes disposed therethrough near second ends thereof, said frame assembly also including fastening members being removably received through said holes of said angled brace members and said elongate front and back members for securing said elongate front and back members to said elongate side members, and further including cables having first ends and second ends which are securely attached to said frame with said first ends being securely attached to said fastening members, said fastening members being pin-like members having eyelet end portions, said elongate front, side, and back members being elongate tubular members with said elongate side members being foldable upon said elongate front member and with said elongate back member being detachably attached to said elongate side members, said frame having a length of approximately 4¼ feet and a width of approximately 2¼ feet;
   a hitch mounting member being securely attached to said frame and being adapted to be fastenably received by a hitch receiver on a vehicle, said hitch mounting member including a tubular member having a first end being securely attached to said elongate front member and extending outwardly therefrom, said tubular member also having an open second end with a bore extending in said hitch mounting member through said open second end, and further having a hole disposed through a side wall thereof near said open second end, said hitch mounting member further including support braces being securely attached to said tubular member and to said elongate front member of said frame;
   a netting arrangement being securely attached to said frame, said netting arrangement being a mesh which is securely and detachably attached along bottoms of said elongate front, side, and back members; and
   adjustable tie-down members being attached to said frame for securing cargo, said adjustable tie-down members including pairs of straps having ends which are securely attached to said frame, and also include buckle members each of which adjustably fastens a respective said pair of straps together to secure cargo loaded within said frame and upon said netting arrangement, said pairs of straps being removably and adjustably disposed across a top of said frame.

* * * * *